Patented Oct. 2, 1928.

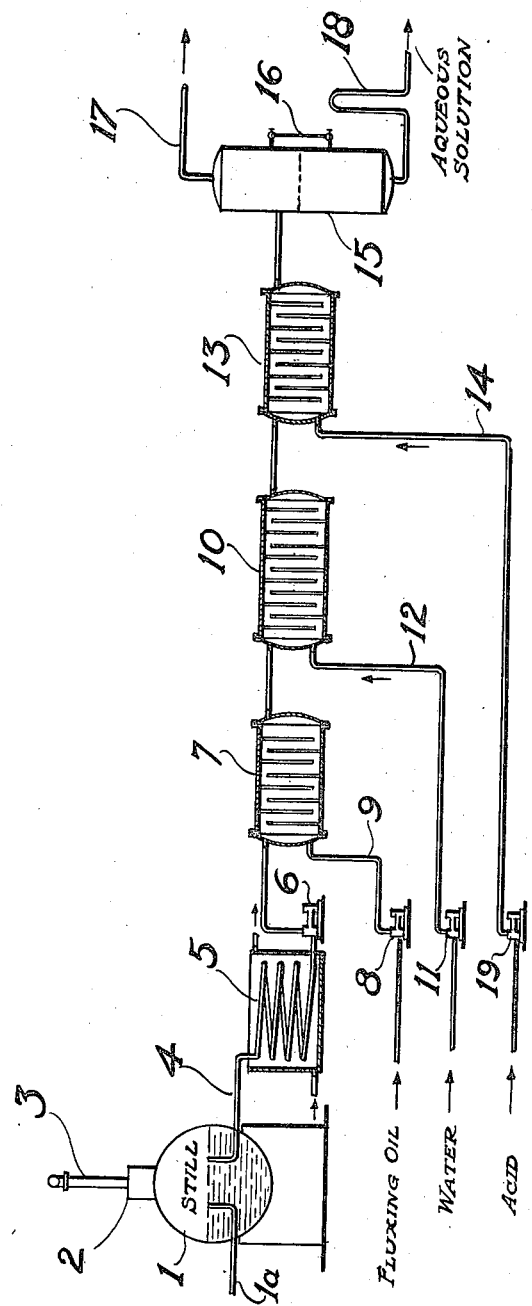

1,686,491

UNITED STATES PATENT OFFICE.

WAYNE S. HUGHES AND JAMES HARROP, OF BAYTOWN, TEXAS, ASSIGNORS TO STANDARD OIL DEVELOPMENT COMPANY, A CORPORATION OF DELAWARE.

PREPARATION OF FUEL OIL.

Application filed January 19, 1927. Serial No. 162,021.

The present invention relates to the preparation of hydrocarbon oil and more specifically to a method of treating residual fuel oils to reduce the quantity of inorganic matter or ash. Our invention will be fully understood from the following description and the drawing which illustrates diagrammatically one form of apparatus for accomplishing our method.

The drawing shows in diagrammatic form a still and the necessary equipment for separating the inorganic matter from a fluid residuum or bottoms.

In the distillation of certain crude or distillate oils, chiefly those containing naphthenic or other organic acids, it has been found advantageous to add an alkali, such as caustic soda, to the still during distillation. The alkali presumably forms a relatively non-volatile salt with the acids in the feed oil and prevents these acids from being carried over in the distillate. The residuum from the distillation is often used as a fuel oil and is subject to the disadvantage of having an abnormally high ash content, due to the naturally occurring inorganic matter and the alkali which has been added. Our process comprises the method of emulsifying the residuum with water and in breaking the emulsion whereby the inorganic matter is withdrawn in the aqueous layer.

Referring specifically to the drawing, the reference character 1 designates a crude or rerun still which is the last of a continuous battery. The other stills of battery are not shown, but still 1 is fed with the residual oil from a previous still by the flow line 1ª and is equipped with the conventional dome 2 and vapor line 3. The residue containing the alkali is removed from the still 1 by a line 4 and passes through a cooler 5 whereby the temperature of the oil is reduced somewhat to avoid danger of fire. A pump 5 now passes the oil through a mixer 7 which may be of any preferred design, and a blending or fluxing stock such as gas oil or any other oil is added to the mixer from storage (not shown) by pump 8 and line 9. The oil blend now flows to a second mixer 10 similar to the first, and water is added by pump 11 and line 12 so that an emulsion is formed and an intimate mixing of oil and water is accomplished. The emulsion flows to a third mixer 13 to which a dilute acid material is added by line 14 and pump 19 and in such quantity that the emulsion is broken forming an oily and an aqueous layer. In the separator 15 which is equipped with a gauge glass 16, the layers are allowed to settle. The oil is removed to storage from the top of the separator by a line 17 and the aqueous layer, which contains the inorganic matter in solution, is withdrawn by the trapped line 18.

In the operation of our process the residual oil may vary in viscosity according to the nature of the crude oil and the quantity of oil distilled, however it is generally necessary to flux this residuum with gas oil or other stock of lower viscosity. The fluxing oil may thus be added in quantity equal to 5 to 50% of the resulting blend according to the specifications to be met by the finished oil. Water is preferably added in equal quantity to the blend of oil to be emulsified, but the proportion may be varied widely. Acid is preferably used to break the emulsion and diluted sulphuric acid has been found suitable. The quantity of acid must be sufficient to displace the naphthenic or other organic acids and to leave the solution slightly on the acid side. Other mineral acids or acid containing materials are also satisfactory.

As an example of our method approximately 740 barrels of soda residuum is fluxed with an equal quantity of gas oil and emulsified with water according to the above method, the quantity of water being sufficient to give approximately 3,000 barrels of emulsion. To this emulsion 1,885 gallons of 35° Bé. sulphuric acid is added, which brings about a clean separation of oils and aqueous layers. Approximately 1,480 barrels of fuel oil of the following specifications are recovered.

| | |
|---|---|
| Gravity | 181° A. P. I. |
| Pensky flash | 230° F. |
| Furol viscosity | 90 @ 122° F. |
| Per cent ash | .016 |

Although the application has particularly mentioned the distillation of a crude oil to form a fuel oil residue, our process is not limited to such oils. Distillates containing organic acids may be treated in a similar manner and the residue may be used for purposes other than fuel. We have also mentioned gas oil as a suitable blending oil, but crude oils, tars and cracked oils may serve, if so desired.

Our process also furnishes a convenient method for obtaining the acids in a relatively pure state. The fluxed residuum containing the organic acids may be distilled to remove the flux oil and the acids as separate cuts, the former being returned for reuse and the acids sold as a commercial product with or without further purification, depending on the use intended. The distillation of the flux oil and the acids may be advantageously accomplished in ordinary atmospheric stills or in vacuum stills which, however, are well known and need not be described herein.

Our method is not to be limited by any theory offered to explain the mechanism of the separation nor by the example which should be regarded merely as an illustration of the method. We wish to be limited only by the following claims in which we intend to claim all novelty in the method.

We claim:

1. A process for separating inorganic matter from the liquid residue resulting from the distillation of hydrocarbon oil in presence of alkali comprising emulsifying said residue with water, breaking said emulsion by addition of an acid material thereto, and withdrawing the aqueous layer containing inorganic matter.

2. A process for separating inorganic matter from the liquid residue resulting from the distillation of hydrocarbon oil in presence of caustic soda comprising fluxing said residue with a hydrocarbon oil, emulsifying the fluxed oil with water, adding an acid material to break the emulsion and withdrawing the aqueous layer so formed.

3. A continuous process for preparing a fuel oil comprising adding to a residuum resulting from the distillating of hydrocarbon oil in presence of caustic soda, a less viscous oil, mixing these with a substantial quantity of water and adding to said mixture dilute sulphuric acid, allowing the mixture to settle into an oily and an aqueous layer and withdrawing said layers separately.

4. A process for purifying fuel oil according to claim 3 which comprises the further step of removing organic acids from the oily layer by distillation.

5. A process for preparing fuel oil from a crude containing organic acids comprising the distillation of the crude in the presence of alkali, to produce a fluid residue, fluxing said residue with a hydrocarbon oil, emulsifying the blend with water, adding acid thereto for the purpose of separating the emulsion into aqueous and oily layers, removing the oily layer, distillating it to recover the flux oil for reuse and the organic acids and withdrawing the purified residue.

In testimony that we claim the foregoing as our invention, we affix our signatures.

WAYNE S. HUGHES.
JAMES HARROP.